US012282926B2

(12) United States Patent
Corazzari et al.

(10) Patent No.: US 12,282,926 B2
(45) Date of Patent: Apr. 22, 2025

(54) NETWORK SERVER AND METHOD FOR RECALLING A FOOD PRODUCT

(71) Applicant: Tetra Laval Holdings & Finance S.A., Pully (CH)

(72) Inventors: Gianni Corazzari, Cavezzo (IT); Gianpaolo Garuti, Modena (IT); Davide Panzera, Bunkeflostrand (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 263 days.

(21) Appl. No.: 17/598,556

(22) PCT Filed: Mar. 17, 2020

(86) PCT No.: PCT/EP2020/057166
§ 371 (c)(1),
(2) Date: Sep. 27, 2021

(87) PCT Pub. No.: WO2020/200743
PCT Pub. Date: Oct. 8, 2020

(65) Prior Publication Data
US 2022/0148007 A1    May 12, 2022

(30) Foreign Application Priority Data

Mar. 29, 2019 (EP) .................... 19166289

(51) Int. Cl.
*G06Q 30/014*    (2023.01)
*G06Q 10/087*    (2023.01)

(52) U.S. Cl.
CPC ......... *G06Q 30/014* (2013.01); *G06Q 10/087* (2013.01)

(58) Field of Classification Search
None
See application file for complete search history.

(56) References Cited

U.S. PATENT DOCUMENTS

| 8,478,251 | B1* | 7/2013 | Okolo | G06Q 10/10 |
| | | | | 705/40 |
| 2001/0034609 | A1* | 10/2001 | Dovolis | G06Q 30/02 |
| | | | | 705/302 |

(Continued)

FOREIGN PATENT DOCUMENTS

| JP | 2004-362205 A | 12/2004 |
| JP | 2009-230290 A | 10/2009 |

(Continued)

OTHER PUBLICATIONS

Myo Min Aung, Yoon Seok Chang, Traceability in a food supply chain: Safety and quality perspectives, Food Control, vol. 39, 2014, pp. 172-184, ISSN 0956-7135, https://doi.org/10.1016/j.foodcont.2013.11.007 (Year: 2014).*

(Continued)

*Primary Examiner* — Paul R Fisher
(74) *Attorney, Agent, or Firm* — Knobbe, Martens, Olson & Bear, LLP

(57) ABSTRACT

A method for recalling a food product using a server (140). The method comprises receiving a recall request and an identification associated to a food package holding the food product, identifying identification registrations linked to the identification from a number of identification checkpoints provided in a logistic network connecting a packaging site with a consumer, wherein each of the identification registrations are associated to a time stamp, identifying a most recent identification registration from the identification registrations, identifying a current logistic node in the logistic network associated with the most recent identification registration, identifying a communication device associated with the current logistic node, and transferring a recall notification to the communication device.

20 Claims, 3 Drawing Sheets

(56) References Cited

U.S. PATENT DOCUMENTS

| | | | | |
|---|---|---|---|---|
| 2002/0040325 A1* | 4/2002 | Takae | ............... | G06Q 10/20 |
| | | | | 705/305 |
| 2002/0087554 A1* | 7/2002 | Seelinger | ............ | G06Q 10/10 |
| 2002/0178046 A1* | 11/2002 | Lawrence | ........... | G06Q 40/08 |
| | | | | 705/35 |
| 2004/0200892 A1* | 10/2004 | Curkendall | ......... | G06Q 50/02 |
| | | | | 340/5.9 |
| 2006/0232410 A1* | 10/2006 | Swan | ................. | G06Q 10/08 |
| | | | | 340/572.1 |
| 2007/0069004 A1* | 3/2007 | Adler | ................. | H04W 4/02 |
| | | | | 235/375 |
| 2009/0204415 A1* | 8/2009 | Baiera | ............... | G06Q 10/087 |
| | | | | 705/303 |
| 2009/0323928 A1* | 12/2009 | Kerschbaum | ....... | G06Q 10/06 |
| | | | | 380/28 |
| 2010/0294203 A1* | 11/2010 | Janke | ................. | A01K 61/54 |
| | | | | 119/236 |
| 2011/0093401 A1* | 4/2011 | Waite | ................. | G06Q 30/06 |
| | | | | 705/303 |
| 2012/0054049 A1* | 3/2012 | Hayes | ................ | G06Q 20/203 |
| | | | | 705/302 |
| 2014/0229330 A1* | 8/2014 | Flores | ............... | G06Q 30/08 |
| | | | | 705/26.1 |
| 2016/0004993 A1* | 1/2016 | Bims | ................. | G06Q 10/087 |
| | | | | 705/28 |
| 2018/0253733 A1* | 9/2018 | Lewis | ............... | H04W 4/80 |

FOREIGN PATENT DOCUMENTS

| | | | |
|---|---|---|---|
| JP | 2019-012568 A | 1/2019 | |
| WO | WO0159660 A1 * | 8/2001 | ............ G06F 17/60 |
| WO | WO2004045981 A1 * | 6/2004 | ............ B65D 75/58 |
| WO | WO 2009/148998 | 12/2009 | |
| WO | WO 2011/010958 | 1/2011 | |
| WO | WO 2011/047278 | 4/2011 | |

OTHER PUBLICATIONS

International Search Report and Written Opinion issued in PCT/EP2020/057166 mailed on Apr. 29, 2020.

* cited by examiner

NETWORK SERVER AND METHOD FOR RECALLING A FOOD PRODUCT

TECHNICAL FIELD

The invention relates to the field of food safety and more particularly to the field of recalling food products that have been found not to be appropriate to be consumed. More specifically, it is related to a method for recalling a food product and a server arranged for recalling the food product.

BACKGROUND ART

In food production today, there are strict food safety regulations to be followed to make sure that consumers are not harmed by food products. The food safety regulations are stipulating which kind of materials that are allowed to be in contact with food products, how often samples should be taken, what type of tests that should be performed on the samples, at which temperature and for how long time the food product should be heat treated in order to be considered safe to consume, and so forth. Even though the regulations are in place, frequent samples are made from the food production and several different quality controls are performed, there is from time to time nevertheless a need to recall food products that have been shipped from a food production site.

Today, when the food products are recalled, distribution centers to which the food packages have been shipped are contacted. If the food packages have been transported from the distribution centers to stores, the distribution centers are in turn contacting the stores. In the event that the food products have reached store shelves and have been sold to consumers before a decision to recall the food products has been made, newspaper and other media can be used for informing the consumers that the food products may be harmful and therefore not to be consumed.

A problem with the approach used today is that there is a risk that the information is halted on its way to the consumer or other party having the food products. Since delivery times from the food production site to the consumer are continuously being improved by e.g. reducing the time the food products are placed in distribution centers, and complex transportation networks are used, there is a risk that the food products that are recalled nevertheless reach the consumers.

To avoid that the consumers are harmed, a strict approach with a high margin of safety is often applied. In practice, this means that if being in doubt the food products are discarded. In other words, to avoid having consumers harmed by food safety non-compliant food products, a large number of food safety compliant food products are discarded to be on the safe side.

Based on the above, there is a need for a method or apparatus that efficiently can provide for that the recall request reaches persons having access to the food products that are recalled such that these are not consumed, and as an effect that health issues can be avoided, and doing this in such a way that food waste can be kept at low levels, such that as few food safety compliant food products are discarded.

SUMMARY

It is an object of the invention to at least partly overcome one or more of the above-identified limitations of the prior art. In particular, it is an object to provide a reliable and time efficient recall notification system for food products.

According to a first aspect it is provided a method for recalling a food product using a server. The method may comprise receiving a recall request and an identification associated to a food package holding the food product, identifying identification registrations linked to the identification from a number of identification checkpoints provided in a logistic network connecting a packaging site with a consumer, wherein each of the identification registrations are associated to a time stamp, identifying a most recent identification registration from the identification registrations, identifying a current logistic node in the logistic network associated with the most recent identification registration, identifying a communication device associated with the current logistic node, and transferring a recall notification to the communication device.

The method may further comprise requesting a recall confirmation from the communication device, and receiving the recall confirmation from the communication device.

The recall request and the identification may be transferred from a food producer linked to the packaging site, and the method may further comprise transferring the recall confirmation to the food producer.

The logistic network may comprise a number of logistic nodes, wherein the logistic nodes may be chosen from a group consisting of packaging site, distribution centers, transport carriers, stores, food storage devices and consumers.

The identification may comprises a package identification stored in a package identification device provided on or in the food package.

The identification may comprise a carrier identification provided in a carrier identification device provided in or on a carrier, such as a pallet or tray, arranged to hold the food package.

The identification may comprise a batch identification linked to a batch of food packages, wherein the food package holding the food product is one of the batch of food packages.

The method may further comprise receiving a request for product information and the identification from the communication device, transmitting the product information to the communication device, setting the consumer associated to the communication device as the current logistic node.

The product information may comprise best before date.

The communication device may be integrated in a food storage device arranged to store the food product and configured to read the package identification from the food package and to receive the recall notification.

According to a second aspect it is provided a server arranged for recalling a food product, wherein the server comprises a memory, a control unit and a transceiver, wherein the transceiver is configured to: receive a recall request and an identification associated to a food package holding the food product, and transfer a recall notification to a communication device, wherein the control unit is configured to: execute an identification registrations identifier function to identify identification registrations linked to the identification from a number of identification checkpoints provided in a logistic network connecting a packaging site with a consumer, wherein each of the identification registrations are associated to a time stamp, execute a most recent identifier function to identify a most recent identification registration from the identification registrations, execute a current logistic node identifier function to identify a current logistic node in the logistic network associated with the most recent identification registration, and execute an associated communication device function to identify the communication device associated with the current logistic node.

The logistic network may comprise a number of logistic nodes, wherein the logistic nodes are chosen from a group consisting of distribution centers, transport carriers, stores, food storage devices and consumers.

The identification may comprise a package identification stored in a package identification device provided on or in the food package.

The transceiver may further be configured to: receive a request for product information and the identification from the communication device, and transmit the product information to the communication device, wherein the control unit is further configured to: execute a current logistic node setting function to set the consumer associated to the communication device as the current logistic node.

The communication device may be integrated in the food storage device arranged to store the food product and configured to read the package identification from the food package and to receive the recall notification.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 generally illustrates a system for recalling a food product by using a server.

DETAILED DESCRIPTION

Figure 1:
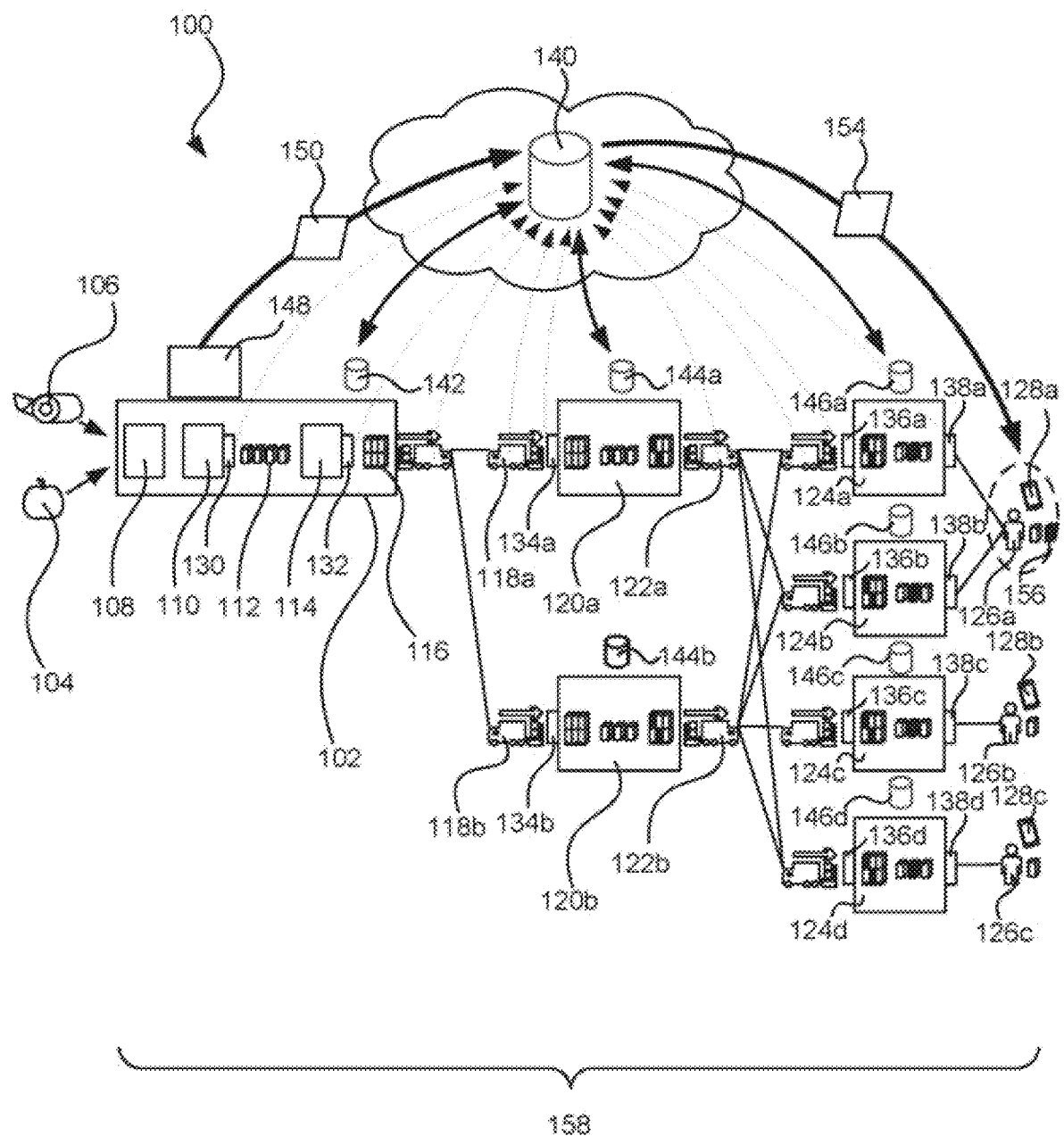

With reference to FIG. 1 a system 100 for recalling a food product is illustrated by way of example. The system 100 comprises a packaging site 102 to which food material 104, e.g. apples to be turned into apple juice, and packaging material 106, e.g. reels of carton packaging material, can be provided. In processing equipment 108 the food material can be formed into the food product. In package equipment 110, the food product can be packaged such that food packages 112 holding the food product are provided. The food packages 112, sometimes also referred to as primary packages, can thereafter be grouped and packaged in secondary packages by downstream equipment 114, also sometimes referred to as a secondary packaging machine. The downstream equipment 114 may also involve a palletizer arranged to pack the secondary packages, or the primary packages directly, onto a pallet, or in more general terms a carrier 116.

From the packaging site 102 the carrier 116 holding the packages 112 may be transported by transport carriers 118a, 118b to distribution centers 120a, 120b. The distribution center 120a, 120b may be a facility owned by a retailer in which goods from various food producers and other types of producers are delivered, repackaged and transported by transport carriers 122a, 122b to stores 124a, 124b, 124c, 124d. The stores 124a, 124b, 124c, 124d may be physical stores, such as grocery stores, in which consumers 126a, 126b, 126c collect the food products to buy and pay at a check out to a cashier, but it may also be a so-called dark store in which the food products are ordered online and collected manually by store personnel or automatically by robots or the like.

As illustrated in FIG. 1, several distribution centers 120a, 120b can deliver food products to the same store 124a, 124b, 124c, 124d and one and the same store can receive the food products from many different distribution centers. Further, it is also possible that the food products are transported from one store to another, or that the food products can be transported from one distribution center to another, or from the store to the distribution center. Further, as illustrated, one and the same consumer 126a may buy the food products from different stores. In addition, even though not illustrated, it is possible that the food products are given from one consumer to another, and also that additional or fewer layers of logistic nodes are provided.

The consumers 126a, 126b, 126c may have communication devices 128a, 128b, 128c, such as mobile phones. Since the communication devices 128a, 128b, 128c can be associated with user identifications these may be associated to the consumers. An advantage with this, in this context, is that if it can be identified that the food product is bought by one of the consumers 126a, the consumer can be reached via the communication device 128a associated to him or her in case the food product is recalled. In a similar manner, communication devices may be associated to the packaging site 102, the distribution centers 120a, 120b, and the stores 124a, 124b, 124c, 124d. For instance, personnel working at the distribution centers may have special communication devices for knowing what products to pick when repackaging, and in order to provide for that recall information is provided efficiently this information may be provided to the personnel via these devices. Another option is to have communication devices in the form of digital dashboards or mobile phones.

To be able to keep track of the food product, identification checkpoints may be provided in the system 100. The identification checkpoints can read a package identification device, such as an RFID tag or NFC chip, provided in or on the food package holding the food product. Since each package can be provided with a unique identification the package can be followed from the packaging site 102 to the consumers 126a, 126b, 126c. Identification checkpoints 130, 132, 134-b, 136a-d, 138a-d may be provided at the packaging equipment 110, at the downstream equipment 114, at delivery points at the distribution centers 120a-b, at delivery points at the stores 124a-d, at the check-out at the stores 124a-d by way of example. As an alternative to having the package identification device in or on the package, the package identification can be printed onto the package.

The identification used for tracing the food products is however not restricted to package identification, but can also comprise a carrier identification, such that the food product can easily be found even if being packed onto a pallet or the like. Further, the identification can comprise a batch identification such that the food products related to the same batch can be spotted expediently. As described above, the identification may be a unique identification, but if enough to be able to trace down to batch level, and not down to package level, the identification can be batch unique. By not having each package provided with a unique identification, a more cost efficient solution may be achieved.

The identification checkpoints 130, 132, 134-b, 136a-d, 138a-d may transfer identification data read from the packages and the carriers to a server 140. By being provided with this data, the server 140 can trace the packages and carriers as they are being transported from the packaging site 102 to the consumers 126a, 126b, 126c. To provide redundancy and to handle situations when the data communication is down, sub-databases 142, 144*a-b*, 146*a-d* may be provided for the packaging site 102, the distribution centers 120*a*, 120*b* and the stores 124*a-d*.

To assure food safety as well as food quality, quality control equipment 148 may be provided. In the system 100 illustrated in FIG. 1 by way of example, it is illustrated that this is connected to the packaging site 102. It is however also possible to have quality control equipment 148 in other places as well, such as in the distribution centers 120*a-b*, In case it is detected that food products not safe to consume have been produced and shipped from the packaging site 102, a recall request 150 and the identification associated to the food package holding the food product can be transmitted from the quality control equipment 148 to the server 140. By having access to all the data generated by the identification checkpoints 130, 132, 134-*b*, 136*a-d*, 138*a-d*, identification registrations linked to the food package can be identified. By using time stamps associated with the identification registrations, a most recent identification registration can be identified. In turn, based on this most recent identification registration a current logistic node can be identified. In other words, it can be determined where the package was last registered. By having communication devices associated to the logistic nodes, e.g. the packaging site 102, the transport carriers 118*a-b*, 122*a-b*, the stores 124*a-d* and the consumers 126*a*-126*c*, the communication device associated to the current logistic node can be identified and thereafter a recall notification can be transferred to this communication device 128*a*. For instance, in case the food product held in the package 156 is to be recalled, the consumer 126*a* would be found to be the current logistic node and the communication device 128*a* associated to him or her would be the communication device to which the recall notification is transmitted. In this way, the package 156 can be identified in a logistic network 158 connecting the packaging site 102 with the consumers 126*a-c*.

Associating the communication device 128*a* to the consumer 126*a* can be achieved in different ways. For instance, if paying groceries by using the communication device 128*a*, e.g. by using a non-physical credit card or other payment solution, such as Apple Pay™, linked to the mobile phone, or having a credit card to be used in combination with the mobile phone, e.g. by using the face recognition or fingerprint recognition capability of the mobile phone for verifying identity of the consumer, the communication device 128*a* is associated to the consumer 126*a* for payment purposes. The fact that there is already an association made for a different purpose can be made use of. For instance, during the payment process, a question can be posed to the consumer if he or she would link to be contacted via the communication device 126*a*, used in the payment process, in case any of the food products being purchased is recalled. If the consumer answers affirmative, the association can be made. Another option is to make the association automatically without posing any question. The communication device 128*a* may also be associated indirectly to the consumer 126*a*. For instance, if food products are purchased and these are linked to a membership card, this may in turn be connected to the communication device 128*a* of the user in case there is a link between the membership card and the communication device.

Still an option, in case the consumer 126*a* uses self-scanning when grocery shopping, i.e. scanning bar codes of the food products himself or herself by using a scanner provided by the store, the scanner may connect to the communication device 128*a*, such as the mobile phone, of the consumer 126*a* and associate the food product that is scanned to the scanner also to the communication device. This option may prove particularly advantageous if the package identification is printed onto the package, such as a QR code. In this case, in case the scanner is an optical scanner, a bar code used for registering the food product for payment purposes and the package identification used for recall purposes may namely be read by one and the same device.

Figure 2:
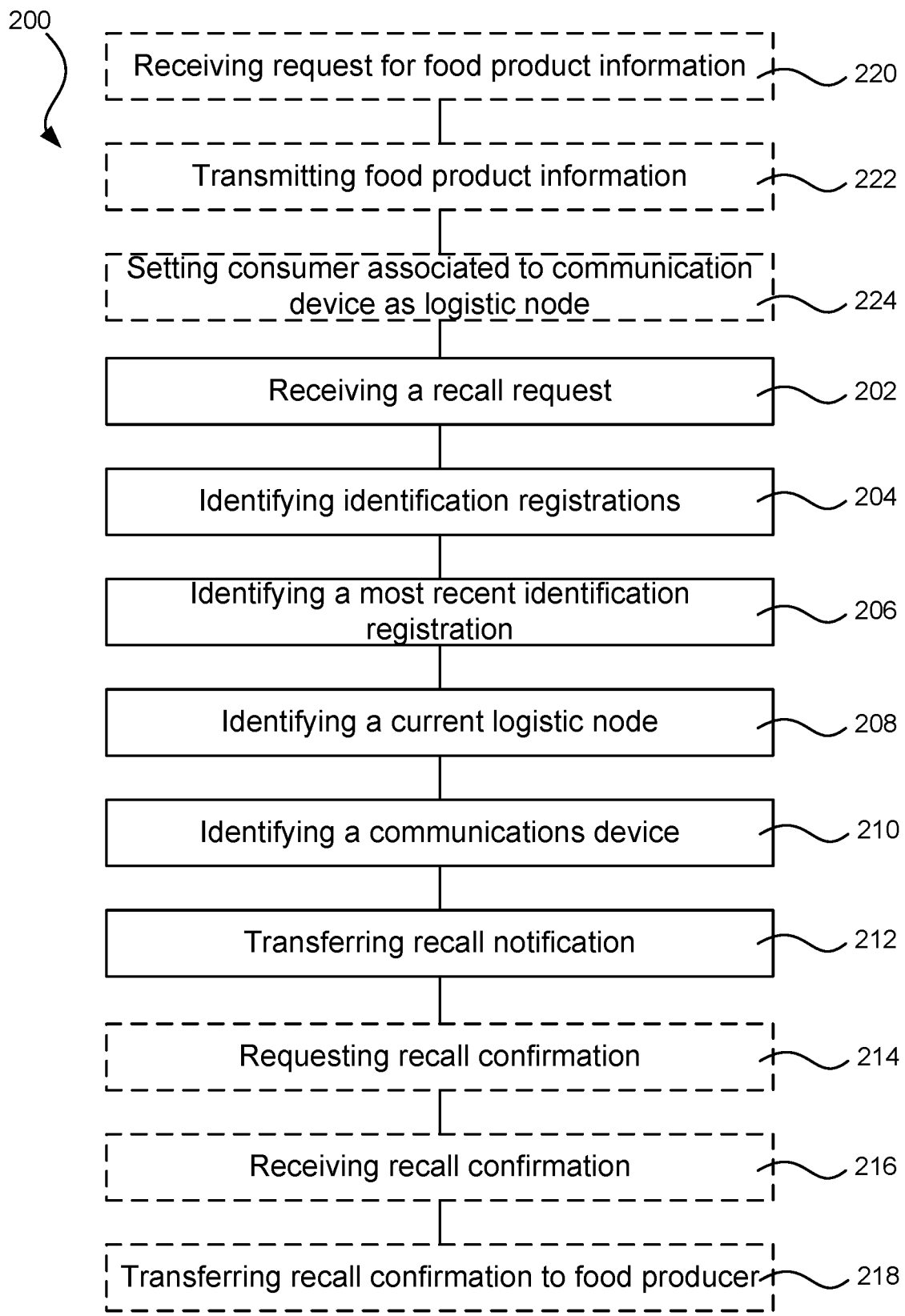
FIG. 2 is a flowchart illustrating a method for recalling the food product.

The approach described above is further illustrated in FIG. 2 in which a flowchart illustrating a method 200 for recalling the food product using the server 140 is provided. In a first step 202, the recall request can be received. Next, in a second step 204, identification registrations from the identification checkpoints linked to the identification from a number of the identification checkpoints in the logistic network can be identified. Each of the identification registrations are associated to a time stamp. Thereafter, in a third step 206, a most recent identification registration can be identified. Then, in a fourth step 208, by making use of that the identification checkpoints locations are known, the current logistic node associated with the most recent identification registration can be identified. Next, in a fifth step 210, the communication device associated with the current logistic node can be identified. Thereafter, in a sixth step 212, a recall notification can be transferred to the communication device.

Optionally, in order to be certain that the recall notification has been received safely, a recall confirmation can be requested in a seventh step 214, and in an eighth step 216 the recall confirmation can be received.

Optionally, in order to provide a food producer, e.g. a company running the packaging site 102, with information that the recall confirmation has been received, the recall confirmation can be transferred to the food produced in a ninth step 218.

In addition, the food product can be linked to the communication device not only based on data collected by the identification checkpoints. In a tenth step 220, a request for product information and the package identification may be received by the server from the communication device. The product information may comprise best before date, nutritional value or other food related information. After having received the request, in an eleventh step 222, the product information may be transmitted to the communication device. By knowing the package identification and how to contact the consumer via the communication device, the consumer associated with the communication device may be set as the current logistic node in a twelfth step 224.

The communication device does not have to be a device solely made for communication. For instance, the communication device may be integrated in a food storage device arranged to store the food product and configured to read the identification from the food package and to receive the recall notification. For example, a smart fridge that can read the identification of the package in order to create grocery shopping lists and notify about close best before dates may also comprise the functionality of receiving recall notifications related to the food products held in the smart fridge.

Figure 3:
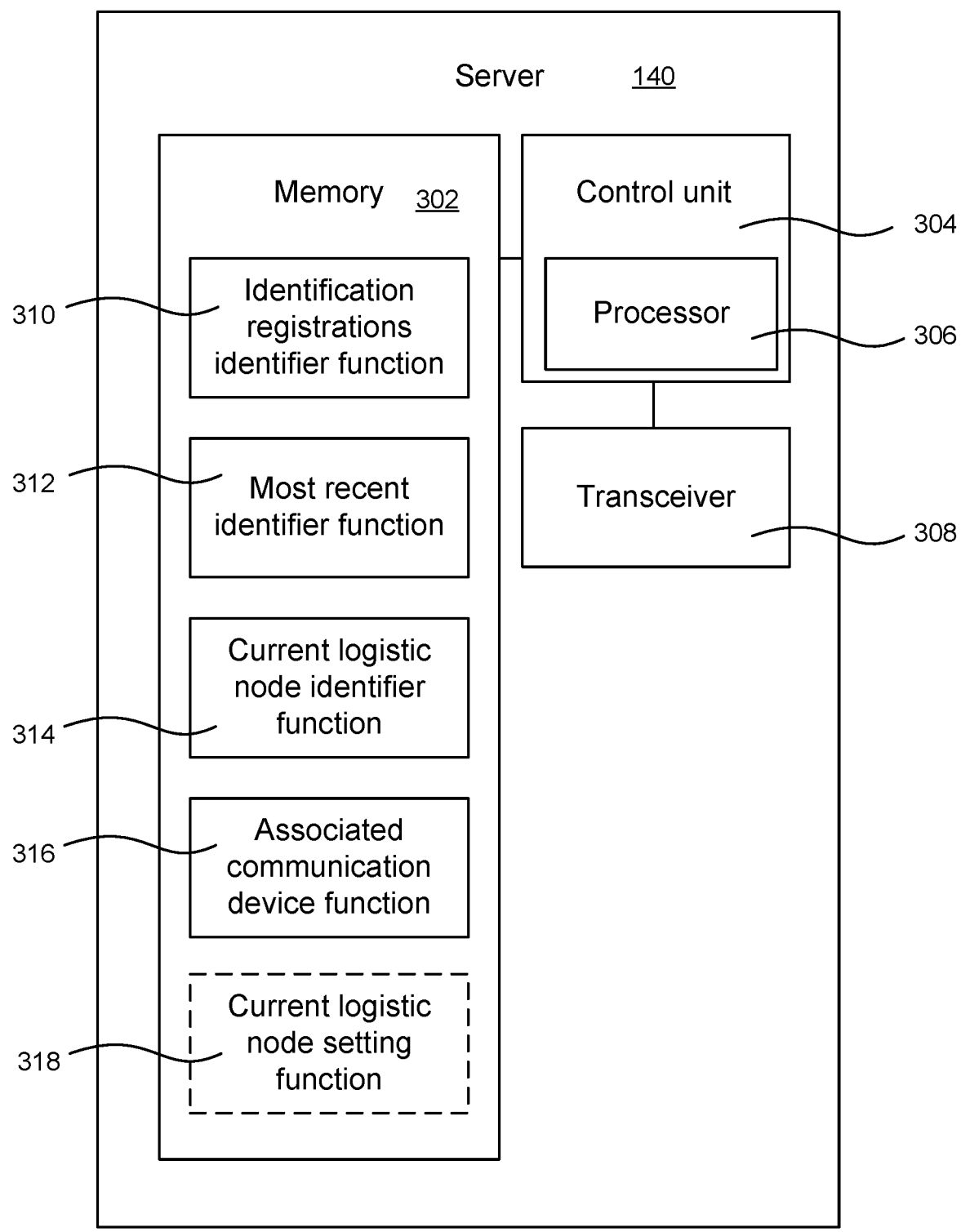
FIG. 3 illustrates the server in further detail.

FIG. 3 illustrates the server 140 for recalling the food product in further detail. The server 140 may comprise a memory 302, a control unit 304 comprising a processor 306, and a transceiver 308.

The transceiver 308 may be configured to receive the recall request and the identification associated to the food package 156 holding the food product, and to transfer the recall notification to the communication device 128*a*.

The memory 302 may comprise instructions in the form of functions that can be executed by the control unit 308. It can be provided an identification registrations identifier function 310 to identify identification registrations linked to the identification from a number of identification checkpoints provided in a logistic network connecting a packaging site with a consumer, wherein each of the identification registrations are associated to a time stamp. Further, a most recent identifier function 312 to identify a most recent identification registration from the identification registrations can be provided. Still further, a current logistic node identifier function 314 to identify a current logistic node in the logistic network associated with the most recent identification registration, and an associated communication device function 316 to identify the communication device associated with the current logistic node can be provided.

Optionally, the transceiver 308 may further be configured to receive a request for product information and the package identification from the communication device 126a-c, and transmit the product information to the communication device 126a-c, and the memory 302 may further comprise a current logistic node setting function 318 to set a consumer 126a associated with the communication device 126a-c as the current logistic node.

From the description above follows that, although various embodiments of the invention have been described and shown, the invention is not restricted thereto, but may also be embodied in other ways within the scope of the subject-matter defined in the following claims.

The invention claimed is:

1. A method for efficiently recalling a food product for reduced food waste using a server, said method comprising:
providing a plurality of identification checkpoints in a network connecting a food product packaging site with a plurality of consumers, the plurality of identification checkpoints being provided at a plurality of nodes in the network that successively handle a food package holding the food product, the nodes comprising one or more of the food product packaging site, a plurality of food distribution centers, a plurality of food transport carriers, a plurality of food stores, a plurality of consumer food storage devices, and a plurality of consumer communication devices, and wherein the plurality of identification checkpoints being configured to read a package identification provided in or on the food package holding the food product;
receiving a recall request and an identification linked to the food package holding the food product from quality control equipment in at least one of the packaging site or one of the plurality of food distribution centers,
identifying identification registrations linked to the identification from the plurality of identification checkpoints provided in the network, wherein each of the identification registrations comprises a time stamp that the package identification was read by an identification checkpoint of the plurality of identification checkpoints,
identifying a most recent identification registration comprising the identification registration with the time stamp that was most recently read by a most recent identification checkpoint of the plurality of identification checkpoints,
identifying a current node of the plurality of nodes in the network providing the most recent identification checkpoint from the most recent identification registration,
at a first time, responsive to identifying the current node as a food distribution center of the plurality of food distribution centers, transferring a recall notification to special communication devices of personnel at the current node to inform what food products are suitable for repackaging as the food package to be handled by a next node of the plurality of nodes in the network such that recalled food products are inaccessible to the plurality of consumers,
at a second time, responsive to identifying the current node as one of the food product packaging site, the food distribution center of the plurality of food distribution centers, or a food store of the plurality of food stores:
transferring the recall notification to communication devices of personnel at the current node,
requesting a recall confirmation from the communication devices of the personnel, and
receiving the recall confirmation from at least one communication device of the personnel to confirm prevention of further transporting of the recalled food package by one of the plurality of food transport carriers to the next node and the food product from being accessible to the consumer, and
at a third time, responsive to identifying the current node as a consumer communication device of the plurality of consumer communication devices during payment for the food product in the food store using the consumer communication device:
transferring the recall notification to the consumer communication device subsequent to departure of the consumer from the food store where the food package was sold and causing a recall of the food package before the food product has been consumed by the consumer.

2. The method according to claim 1, further comprising:
requesting the recall confirmation from the consumer communication device, and
receiving the recall confirmation from the consumer communication device.

3. The method according to claim 2, wherein the recall request and the identification is transferred from a food producer linked to the packaging site, said method further comprises:
transferring the recall confirmation to the food producer.

4. The method according to claim 1, wherein the identification comprises the package identification stored in a package identification device provided on or in the food package.

5. The method according to claim 1, wherein the identification comprises a carrier identification provided in a carrier identification device provided in or on a carrier.

6. The method according to claim 1, wherein the identification comprises a batch identification linked to a batch of food packages, and wherein the food package holding the food product is one of the batch of food packages.

7. The method according to claim 1, further comprising:
receiving a request for product information and the identification from the consumer communication device,
transmitting the product information to the consumer communication device, and
setting the consumer associated to the consumer communication device as the current node.

8. The method according to claim 7, wherein the product information comprises best before date.

9. The method according to claim 1, wherein the consumer communication device is configured to read the package identification from the food package and to receive the recall notification.

10. The method of claim 5, wherein the carrier comprises a pallet or tray arranged to hold the food package.

11. The method of claim 1, wherein the identification of the current node as the consumer communication device comprises verifying identity of the consumer during use of a digital payment for the food product in the food store using the consumer communication device, the food store comprising at least one of a physical store or a dark store.

12. The method of claim 1, wherein the identification of the current node as the consumer communication device comprises using a food store membership card linked to the consumer communication device during the payment for the food product in the food store.

13. The method of claim 1, wherein the identification of the current node as the consumer communication device comprises using the consumer communication device to scan the food product during the payment for the food product in the food store.

14. The method according to claim 1, wherein the identification registrations are stored in at least one sub-server so that the most recent identification registration can be identified if the server is down.

15. The method of claim 1, wherein the identification of the current node as the consumer communication device comprises verifying identity of the consumer during the payment for the food product in the food store using at least one of face recognition or fingerprint recognition from the consumer communication device.

16. The method of claim 1, further comprising:
at a third time, responsive to identifying the current node as a consumer food storage device of the plurality of consumer storage devices:
updating a consumer grocery shopping list comprising a plurality of products to include the food product,
transferring the recall notification to at least one of the consumer storage device,
requesting the recall confirmation from the consumer storage device, and
receiving the recall confirmation from the consumer storage device to confirm recall of the food package before the food product has been consumed by the consumer,
wherein the consumer storage device is configured to provide recall notifications and product information associated with the plurality of products to the consumer, the product information of the food product comprising a best before date and nutritional value.

17. A server arranged for efficiently recalling a food product for reduced food waste, comprising:
a memory;
a transceiver configured to be connected to a network comprising a plurality of identification checkpoints and connecting a food product packaging site with a plurality of consumers, the plurality of identification checkpoints being provided at a plurality of nodes in the network that successively handle a food package holding the food product, the nodes comprising one or more of the food product packaging site, a plurality of food distribution centers, a plurality of food transport carriers, a plurality of food stores, a plurality of consumer food storage devices, and a plurality of consumer communication devices, and wherein the plurality of identification checkpoints being configured to read a package identification provided in or on the food package holding the food product, the transceiver further configured to:
receive a recall request and an identification linked to the food package holding the food product from quality control equipment in at least one of the packaging site or one of the plurality of food distribution centers; and
a controller configured to:
identify identification registrations linked to the identification from the plurality of identification checkpoints provided in the network connecting, wherein each of the identification registrations comprises a time stamp that the package identification was read by an identification checkpoint of the plurality of identification checkpoints,
identify a most recent identification registration comprising the identification registration with the time stamps that was most recently read by a most recent identification checkpoint of the plurality of identification checkpoints,
identify a current node of the plurality of nodes in the network providing the most recent identification checkpoint from the most recent identification registration,
responsive to identifying the current node as a food distribution center of the plurality of food distribution centers, transfer a recall notification to special communication devices of personnel at the current node to inform what food products are suitable for repackaging as the food package to be handled by a next node of the plurality of nodes in the network such that recalled food products are inaccessible to the plurality of consumers,
responsive to identifying the current node as one of the food product packaging site, the food distribution center of the plurality of food distribution centers, or a food store of the plurality of food stores:
transfer the recall notification to communication devices of personnel at the current node,
request a recall confirmation from the communication devices of the personnel, and
receive the recall confirmation from at least one communication device of the personnel to confirm prevention of further transporting of the recalled food package by one of the plurality of food transporters to the next node and the food product from being accessible to the consumer, and
responsive to identifying the current node as a consumer communication device of the plurality of consumer communication devices during payment for the food product in the food store using the consumer communication device:
transfer the recall notification to the consumer communication device subsequent to departure of the consumer from the food store where the food package was sold and cause a recall of the food package before the food product has been consumed by the consumer.

18. The server according to claim 17, wherein the identification comprises the package identification stored in a package identification device provided on or in the food package.

19. The server according to claim 17, wherein:
the transceiver is further configured to:
receive a request for product information and the identification from the consumer communication device, and transmit the product information to the consumer communication device, and the controller is further configured to:
set the consumer associated to the consumer communication device as the current node.

20. The server according to claim 17, wherein the consumer communication device is configured to read the package identification from the food package and to receive the recall notification.

\* \* \* \* \*